United States Patent
Kanai et al.

(10) Patent No.: US 12,194,530 B2
(45) Date of Patent: Jan. 14, 2025

(54) ADDITIVE MANUFACTURING POWDER MATERIAL AND METHOD FOR MANUFACTURING ADDITIVE MANUFACTURING POWDER MATERIAL

(71) Applicant: DAIDO STEEL CO., LTD., Nagoya (JP)

(72) Inventors: Daisuke Kanai, Nagoya (JP); Yuki Matsuoka, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 0 days.

(21) Appl. No.: 18/070,701

(22) Filed: Nov. 29, 2022

(65) Prior Publication Data

US 2023/0173577 A1 Jun. 8, 2023

(30) Foreign Application Priority Data

Dec. 6, 2021 (JP) .................. 2021-197469

(51) Int. Cl.
*B22F 1/054* (2022.01)
*B22F 9/16* (2006.01)

(52) U.S. Cl.
CPC .............. *B22F 1/054* (2022.01); *B22F 9/16* (2013.01); *B22F 2301/355* (2013.01); *B22F 2304/054* (2013.01); *B22F 2304/10* (2013.01)

(58) Field of Classification Search
CPC ...... B22F 1/054; B22F 9/16; B22F 2301/355; B22F 2304/054; B22F 2304/10
See application file for complete search history.

(56) References Cited

U.S. PATENT DOCUMENTS

| | | | |
|---|---|---|---|
| 2020/0105447 A1* | 4/2020 | Nakajima | H01F 1/14766 |
| 2020/0398338 A1 | 12/2020 | Kasperchik et al. | |
| 2021/0260650 A1 | 8/2021 | Colon et al. | |

FOREIGN PATENT DOCUMENTS

| | | |
|---|---|---|
| EP | 3 753 653 A1 | 12/2020 |
| JP | 2019-183199 A | 10/2019 |
| JP | 2020-059902 A | 4/2020 |

OTHER PUBLICATIONS

B. Faure, "Particle Interactions at the Nanoscale". Stockholm University, Doctoral thesis, p. 19, Table I-2.2 (2012).
Extended European Search Report, dated May 3, 2023, in European Application No. EESR 22211722.8.
Canadian Office Action, dated Mar. 21, 2024 in Canadian Application No. 3,182,987 (In English).

* cited by examiner

*Primary Examiner* — Brian D Walck
*Assistant Examiner* — Nazmun Nahar Shams
(74) *Attorney, Agent, or Firm* — MCGINN I.P. LAW GROUP, PLLC.

(57) ABSTRACT

The present invention relates to an additive manufacturing powder material including Fe alloy particles each having an oxide film on a surface thereof, in which the Fe alloy particles satisfy d≤15 and I/d≤0.025, where d [nm] represents a thickness of the oxide film, and a peak intensity ratio I represents an intensity ratio IB/IA of a peak B in a region B of a Raman shift of 1,309 to 1,329 $cm^{-1}$ to a peak A in a region A of a Raman shift of 657.5 to 677.5 $cm^{-1}$ in a Raman spectrum.

11 Claims, 4 Drawing Sheets

ADDITIVE MANUFACTURING POWDER MATERIAL AND METHOD FOR MANUFACTURING ADDITIVE MANUFACTURING POWDER MATERIAL

CROSS-REFERENCE TO RELATED APPLICATIONS

This application is based on and claims priority under 35 USC 119 from Japanese Patent Application No, 2021-197469 filed on Dec. 6, 2021, the contents of which are incorporated herein by reference.

TECHNICAL FIELD

The present invention relates to an additive manufacturing powder material and a method for manufacturing an additive manufacturing powder material, and more particularly, the present invention relates to a powder material formed of an Fe-based alloy that can be used as a raw material in additive manufacturing, and a method for manufacturing the powder material.

BACKGROUND ART

As a new technique for manufacturing a three-dimensional shaped object, an additive manufacturing (AM) technique has recently been remarkably developed. As one type of the additive manufacturing technique, there is an additive manufacturing method using solidification of a powder material by energy beam irradiation. The additive manufacturing method using a metal powder material include two representative methods, i.e., a powder bed fusion method and a powder deposition method.

Specific examples of the powder bed fusion method include a selective laser melting method (SLM) and an electron beam melting method (EBM). In these methods, a powder material formed of metal is supplied onto a base material serving as a base to form a powder bed, and a predetermined position of the powder bed is irradiated with an energy beam such as a laser beam or an electron beam based on three-dimensional design data. The powder material on the irradiated portion is solidified by melting and re-solidification, and thus a shaped object is formed. The supply of the powder material to the powder bed and the shaping by the energy beam irradiation are repeated to sequentially laminate and form the shaped object in layers, thereby obtaining a three-dimensional shaped object.

On the other hand, specific examples of the powder deposition method include a laser metal deposition (LMD) method. In this method, a metal powder is injected from a nozzle onto a position where a three-dimensional structure is to be formed and simultaneously irradiated with a laser beam, thereby obtaining a three-dimensional shaped object having a desired shape.

In the case where a three-dimensional shaped object formed of a metal material is manufactured using the additive manufacturing method as described above, a structure in which distribution of constituent materials is non-uniform, such as voids and defects, may be generated in the obtained three-dimensional shaped object. It is desirable to inhibit the generation of such a non-uniform structure as much as possible. In the additive manufacturing method using a metal material, a plurality of factors can be considered responsible for the generation of non-uniform distribution of the constituent material inside the three-dimensional shaped object to be manufactured. As one of the factors, a state of the powder material before energy beam irradiation may have a large influence on the state of the three-dimensional shaped object to be obtained.

For example, in the powder bed fusion method, when a powder material can be smoothly supplied onto a base material to stably form a powder bed in which the powder material is uniformly spread, or when the powder bed can be filled with the powder material at a high density, a three-dimensional shaped object having high homogeneity can be easily obtained through irradiation of the powder bed with an energy beam. Also in the powder deposition method, a three-dimensional shaped object can be stably formed by supplying the powder material from a nozzle smoothly and with high uniformity. Such smooth supply of the powder material and high density filling can be promoted as the powder material used as a raw material of the three-dimensional shaped object in the additive manufacturing method has higher fluidity. As a result, a three-dimensional shaped object having high uniformity can be obtained through irradiation with an energy beam.

Enhancing the fluidity of the powder material may be achieved by, for example, reducing an adhesive force (attractive interaction) acting between particles. As a means for this purpose, a method of forming a compound film such as a metal oxide film on the surface of metal particles has been often used. For example, Patent Literature 1 discloses, as a metal powder material having high fluidity, a metal powder material including particles which have an average particle diameter of 500 nm or more, and include an internal region formed of metal and a coating layer in which the coating layer is formed of an insulating inorganic compound, coats a surface of the internal region, and has a thickness of 15 nm or more. Here, examples of the insulating inorganic compound constituting the coating layer include a metal oxide containing at least one kind of metal constituting the internal region. In addition, Patent Literature 2 discloses a method for manufacturing an additive manufacturing powder material capable of maintaining fluidity for a long period of time, in which a powdery base material which is an iron material is heated in an oxygen-containing atmosphere in a predetermined temperature range so that the oxygen content thereof increases in a range of 0.0025 wt % or more and 0.0100 wt % or less as compared with the base material, thereby forming an oxide film on a surface of the base material.

Patent Literature 1: JP-A-2019-183199
Patent Literature 2: JP-A-2020-59902

SUMMARY OF INVENTION

As described above, in order to enhance the fluidity of the powder material, it is effective to form an oxide film formed of a metal oxide on the surface of the metal particles. As a lower limit of the thickness of the coating layer is specified in Patent Literature 1, the effect of improving the fluidity is enhanced when the oxide film is formed to be thick to some extent. However, in the case of manufacturing a three-dimensional shaped object by the additive manufacturing method, when the raw material powder includes a large amount of oxides, the oxides act as impurities in the three-dimensional shaped object, and there is a possibility that the quality of the three-dimensional shaped object is deteriorated. From this viewpoint, it can be said that it is desirable to form the oxide film on the surface of the metal particle to be thin.

On the other hand, depending on the kind of the metal, the oxide may take a plurality of chemical states (oxidation numbers). In this case, the oxides in the respective chemical states may have different contributions to the improvement of the fluidity of the powder material. Therefore, when the kind of the oxide is appropriately selected, a high fluidity improving effect may be obtained even in the case where the oxide film is thinned.

An object of the present invention is to provide an additive manufacturing powder material that exhibits high fluidity even when an oxide film formed on a surface of metal particles is thin, and a manufacturing method by which such an additive manufacturing powder material can be obtained.

In order to solve the above problems, the additive manufacturing powder material according to the present invention is an additive manufacturing powder material including Fe alloy particles each having an oxide film on a surface thereof, in which the Fe alloy particles satisfy d≤15 and I/d≤0.025, where d [nm] represents a thickness of the oxide film, the powder material gives a Raman spectrum having a peak A with a peak top in a region A of a Raman shift of 657.5 to 677.5 $cm^{-1}$ and a peak B with a peak top in a region B of a Raman shift of 1,309 to 1,329 $cm^{-1}$, IA represents an integrated intensity of the peak A in the region A in the Raman spectrum, IB represents an integrated intensity of the peak B in the region B in the Raman spectrum, and a peak intensity ratio I represents an intensity ratio IB/IA of the peak B to the peak A.

Here, the thickness of the oxide film preferably satisfies 8≤d≤15. The peak intensity ratio in the Raman spectrum preferably satisfies I≤0.30. Furthermore, an avalanche angle of the additive manufacturing powder material may be less than 40°.

The method for manufacturing an additive manufacturing powder material according to the present invention, including preparing Fe alloy particles by a gas atomization process, and then heating the Fe alloy particles in vacuum to form an oxide film on the surface thereof.

In a powder material including Fe alloy particles, the peak A having a peak top in a region of a Raman shift of 657.5 to 677.5 $cm^{-1}$ is a characteristic peak of $Fe_3O_4$, and the peak B having a peak top in a region of a Raman shift of 1309 to 1329 $cm^{-1}$ is a characteristic peak of $Fe_2O_3$. In other words, the smaller the value of the peak intensity ratio I calculated as IB/IA is, the larger the proportion of $Fe_3O_4$ to $Fe_2O_3$ in the oxide film is, where IA and IB are integrated intensities of the peak A and the peak B, respectively. $Fe_3O_4$ has a smaller Hamaker constant than $Fe_2O_3$, inhibits the adhesive force between particles, and is highly effective in improving fluidity. Therefore, controlling I/d to a small value of 0.025 or less leads to the oxide film containing a large amount of $Fe_3O_4$, and thus can provide a high fluidity improving effect even in the case where the thickness d of the oxide film is as small as 15 nm or less.

Here, in the case where the thickness of the oxide film on the surface of the particles satisfies 8≤d≤15, the oxide film has a thickness sufficient to exhibit a high fluidity improving effect, and can be regulated to a sufficiently small thickness that does not act as an impurity that deteriorates the quality of a three-dimensional shaped object in the case of performing additive manufacturing.

In the case where the peak intensity ratio in the Raman spectrum satisfies I≤0.30, the oxide film contains $Fe_3O_4$ in a sufficiently large amount relative to $Fe_2O_3$, and I/d is easily regulated to 0.025 or less. Therefore, the fluidity of the additive manufacturing powder material can be effectively increased.

Furthermore, in the case where the avalanche angle of the additive manufacturing powder material is less than 0°, it is ensured that the additive manufacturing powder material has sufficiently high fluidity, and the additive manufacturing powder material can be suitably used as a raw material for additive manufacturing.

In the method for manufacturing an additive manufacturing powder material according to the present invention, Fe alloy particles are prepared by a gas atomization process, and then heated in vacuum to form an oxide film on the surface thereof. Only a small amount of oxide is formed on the surface of the Fe alloy particles prepared by the gas atomization method, and an oxide film grows on the particle surface through heating. At this time, by performing heating in vacuum, $Fe_3O_4$ can be preferentially formed on the oxide film as compared with $Fe_2O_3$, $Fe_3O_4$ has a smaller Hamaker constant than $Fe_2O_3$, and inhibits the adhesive force between particles. Therefore, it is possible to manufacture a powder material which has high fluidity and can be suitably used for additive manufacturing even when the thickness of the oxide film is thin.

DESCRIPTION OF EMBODIMENTS

Figure 1:
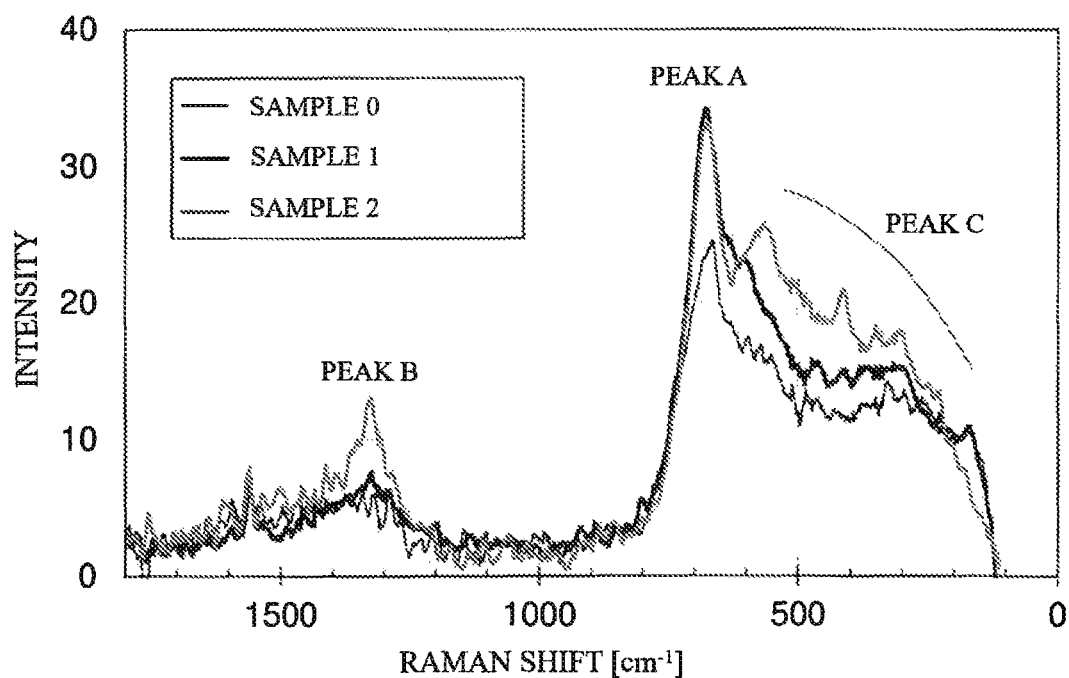
FIG. 1 shows Raman spectra for three kinds of powder materials: Sample 0 refers to a powder material before oxidation, Sample 1 refers to a powder material oxidized in vacuum, and Sample 2 refers to a powder material oxidized in atmosphere.

Hereinafter, an additive manufacturing powder material and a method for manufacturing an additive manufacturing powder material according to an embodiment of the present disclosure will be described in detail. Hereinafter, unless otherwise specified, various characteristics refer to values measured at room temperature in atmosphere.

[Additive Manufacturing Powder Material]

An additive manufacturing powder material (hereinafter, simply referred to as a powder material in some cases) according to an embodiment of the present invention includes Fe alloy particles each having an oxide film on a surface thereof; and a thickness d of the oxide film and a film index I/d obtained from an intensity ratio I of predetermined peaks in a Raman spectrum and the thickness d of the oxide film fall within a predetermined range.

(1) Composition of Additive Manufacturing Powder Material

As a material composition of the powder material according to the present embodiment, an alloy composition is not particularly limited as long as the alloy composition is an Fe alloy, that is, an alloy containing Fe as a main component. A specific alloy composition may be appropriately selected according to an alloy composition desired for a three-dimensional shaped object to be manufactured by additive manufacturing, and examples thereof include stainless steel, carbon steel, and tool steel. The powder material may include particles of one kind of Fe alloy or may include particles of two or more kinds of Fe alloys.

Specific examples of the composition of the above-exemplified alloy compositions include following ones. Components described with only their upper limits mean that these components are not essential and may not be contained.
Stainless steel: (in mass % basis) C≤0.40%, Si≤1.0%, Mn≤1.0%, Ni≤15.0%, 10.0%≤Cr≤20.0%, Mo≤3.0%, Cu≤5.0%, and Nb≤0.7%, with the balance being Fe and inevitable impurities.
Tool steel: (in mass % basis) C≤0.50%, Si≤1.50%, Mn≤0.60%, 4.0%≤Cr≤6.0%, 0.90%≤Mo≤1.50%, and 0.20%≤V≤1,30%, with the balance being Fe and inevitable impurities.
Maraging steel: (in mass % basis) C≤0.03%, Si≤0.10%, Mn≤0.10%, 17.0%≤Ni≤19.0%, 8.0%≤Co≤10.0%, 4.0%≤Mo≤6.0%, 0.50%≤Ti≤0.80%, 0.05%≤Al≤0.15%, with the balance being Fe and inevitable impurities.

A particle diameter of the Fe alloy particles is not particularly limited, but it is preferable that the Fe alloy particles have a particle size of micron order from the viewpoint of being suitably used as a raw material for additive manufacturing. Specifically, an average particle diameter (d50) of the Fe alloy particles can be 10 μm or more and 500 μm or less. It is particularly preferable that the average particle diameter is 10 μm or more and 100 μm or less. The average particle diameter (d50) refers to a particle diameter at which an undersieve cumulative fraction in a distribution on a mass basis is 50%.

It is preferable that the powder material according to the present embodiment includes only Fe alloy particles, excluding inevitable impurities, and is used for additive manufacturing in a state of only the Fe alloy particles. However, other types of particles may be appropriately added and used. Examples of the other type of particles include nanoparticles. The nanoparticles can be interposed between adjacent metal particles to secure a distance between the metal particles, thereby reducing an attractive force acting between the metal particles. As a result, the fluidity of the powder material including metal particles can be increased. As the nanoparticles, particles of a metal oxide, particularly particles of an oxide of a light metal element such as Si, Al, or Ti can be suitably used. The nanoparticles do not substantially affect the three-dimensional shaped object to be manufactured due to their small volume, but an addition amount thereof may be regulated to 0.1 mass % or less based on the Fe alloy particles. In the powder material according to the present embodiment, since the film index I/d of the metal particles is regulated to a predetermined upper limit or less, the powder material exhibits sufficiently high fluidity even in the case where nanoparticles are not added.

It is preferable that the powder material contains, as the metal particles having a particle diameter of micron order, only metal particles which are formed of an Fe alloy and have the thickness d of the oxide film and the film index I/d falling within in predetermined ranges described below. However, particles formed of an alloy other than the Fe alloy may be added to the Fe alloy particles. In this case, the content of the particles other than the Fe alloy is preferably smaller than that of the Fe alloy particles, and the thickness d of the oxide film on a surface of the particles formed of an alloy other than the Fe alloy preferably satisfies the following predetermined range. It is preferable that the powder material does not contain other Fe alloy particles that do not satisfy the predetermined ranges, described below, of the thickness d of the oxide film and the film index I/d, except for inevitable impurities.

(2) Thickness of Oxide Film

In the Fe alloy particles contained in the powder material according to the present embodiment, the thickness d [nm] of the oxide film formed on the surface is 15 nm or less (d≤15). Here, the thickness of the oxide film is an average value of thickness of the oxide film in each particle. The thickness of the oxide film can be estimated by a detection method such as micro Auger electron spectroscopy, by which a depth distribution of an element abundance can be known. For example, the average value of the thicknesses of the oxide films in five randomly selected particles may be evaluated. At this time, the depth at which an oxygen concentration is half that of the outermost surface may be estimated and used as the thickness of the oxide film.

In the powder material, the thickness of the oxide film is regulated to 15 nm or less, so that, when forming a three-dimensional shaped object by additive manufacturing, the oxide is less likely to act as an impurity that deteriorates the quality of a three-dimensional shaped object in the obtained three-dimensional shaped object. From the viewpoint of enhancing the effect, the thickness of the oxide film is more preferably 13 nm or less, and further preferably 12 nm or less.

The lower limit of the thickness of the oxide film in the powder material is not particularly limited. However, since the oxide film has an effect of reducing the adhesive force between particles in the powder material to increase the fluidity, it is preferable that at least an oxide film having a thickness detected as having a thickness equal to or greater than a detection limit in a detection method such as Auger electron spectroscopy is formed. More preferably, the thickness of the oxide film is 8 nm or more, further preferably 9 nm or more, and even more preferably 10 nm or more.

(3) Chemical State of Oxide Film

It is known that the oxide of Fe takes a plurality of chemical states (oxidation numbers), and the oxide film on the surface of the Fe alloy particles can also contain Fe in a plurality of chemical states. The chemical state of the oxide film greatly affects the fluidity of the powder material.

In the powder material according to the present embodiment, the chemical state of the oxide film on the surface of the Fe alloy is defined by a Raman spectrum obtained by Raman spectrometry. FIG. 1 shows Raman spectra for three kinds of Fe alloy powders. Two characteristic peaks are observed in a displayed region. These peaks will be described with reference to Sample 2 as an example.

When observing the Raman spectrum of Sample 2, a clear peak structure having peak tops in a region (region A) of a Raman shift of 657.5 to 677.5 cm$^{-1}$ and a region (region B) of a Raman shift of 1,309 to 1,329 cm$^{-1}$ is observed. These peaks are referred to as a peak A and a peak B, respectively. From comparison with a standard spectrum of a pure substance, the peak A is unique to $Fe_3O_4$, and the peak B is unique to $Fe_2O_3$. Similar to the peak B, a broad peak (peak C) on a lower wave number side of the peak A is also derived from $Fe_2O_3$.

Since the peak A and the peak B are attributed to $Fe_3O_4$ and $Fe_2O_3$, respectively, the intensity ratio of the peak A to the peak B is an index reflecting an abundance ratio of $Fe_3O_4$ to $Fe_2O_3$ in the oxide film. In terms of the ratio to the peak A, the higher the intensity of the peak B is, the higher the proportion of $Fe_2O_3$ in the oxide film is. Therefore, in the present embodiment, an integrated intensity IA of the peak A and an integrated intensity IB of the peak B are estimated, the intensity ratio I of the peak B to the peak A is calculated (I=IB/IA), and the intensity ratio I is used as an index indicating the chemical state of the oxide film.

In estimating the peak ratio, the Raman spectrum is preferably obtained by Raman spectrometry using laser light having a wavelength of 532 nm as excitation light. In particular, it is preferable to obtain the Raman spectrum for each particle by microscopic Raman spectrometry. In the obtained Raman spectrum, a background (baseline) is removed, and then a spectral intensity is integrated to obtain the integrated intensity IA of the peak A and the integrated intensity IB of the peak B. An integration range is a range of a Raman shift of 657.5 to 677.5 cm$^{-1}$ (region A) for the peak A and a range of a Raman shift of 1,309 to 1,329 cm$^{-1}$ (region B) for the peak B. In the Raman spectrum of the Fe alloy particles, the peaks A, B, and C appear apart from each other to some extent, and the region A and the region B are set sufficiently away from a region where these peaks overlap, and therefore, when calculating the integrated intensities IA and IB, it is not necessary to perform peak separation using curve fitting, and the spectral intensities themselves may be integrated within the respective predetermined integration range in the Raman spectrum from which the background has been removed.

Once the integrated intensities IA and IB of the peaks A and B are obtained, the peak ratio I can be calculated as a ratio of the integrated intensity IA to the integrated intensity IB (I=IB/IA). In the case of using microscopic Raman spectrometry, measurement may be performed on a plurality of randomly selected particles, and the intensity ratio I may be estimated as an average value. For example, background-removed Raman spectra of a plurality of particles may be averaged, and the integrated intensities IA and IB may be estimated and the peak ratio I may be calculated for the averaged spectrum.

In the present embodiment, a value of I/d obtained by dividing the peak ratio I obtained from the Raman spectrum by the thickness d [nm] of the oxide film described above is used as a film index to define the state of the oxide film. In the powder material according to the present embodiment, the value of the film index is limited to 0.025 or less (I/d≤0.025).

As shown in the following Example, the present inventors have found that, in the powder material formed of the Fe alloy particles, the smaller the value of the film index I/d is, the higher the fluidity of the powder material is. For example, the thickness of the oxide film is substantially the same between Sample 1 and Sample 2 whose Raman spectra are shown in FIG. 1, but it is apparent from the visual evaluation of the spectrum that the peak B appears more strongly in Sample 2, and the peak ratio I becomes larger in Sample 2. That is, the film index I/d is larger in Sample 2 than in Sample 1. Actually, as will be described in detail in the following Example, when estimating each film index, the film index is 0.025 or less in Sample 1 and exceeds 0.025 in Sample 2. Then, in Sample 1, higher fluidity than that of Sample 2 is obtained.

The fluidity of the powder material increases as the adhesive force (attractive interaction) between the particles decreases. It is known that the adhesive force between particles is proportional to a Hamaker constant. According to Reference Literature, the Hamaker constant in the case where water is a medium is smaller in $Fe_3O_4$ than in $Fe_2O_3$ as 39 zJ for $Fe_2O_3$ and 33 zJ for $Fe_3O_4$ (Reference Literature: B. Faure, "Particle interactions at the nanoscale", Stockholm University, Doctoral thesis (2012)). That is, in the case where the thickness of the oxide film is the same in the powder material formed of the Fe alloy particles, the powder material exhibits higher fluidity as the proportion of $Fe_3O_4$ to $Fe_2O_3$ in the oxide film increases. In the case where the oxide film is thick, the fluidity of the powder material is easily improved due to the effect of the thickness of the oxide film. Therefore, in the case where the oxide film is thick, even when the abundance ratio of $Fe_3O_4$ to $Fe_2O_3$ is small, a high fluidity improvement effect can be easily obtained as compared to the case where the oxide film is thin. Conversely, in the case where the oxide film is thin, it is necessary to increase the abundance ratio of $Fe_3O_4$ to $Fe_2O_3$ compared to the case where the oxide film is thick, in order to sufficiently improve the fluidity of the powder material.

In other words, the abundance ratio of $Fe_3O_4$ necessary for sufficiently improving the fluidity of the powder material depends on the thickness of the oxide film. The larger the thickness is, the smaller the abundance ratio of $Fe_3O_4$ to $Fe_2O_3$ may be. Therefore, in the present embodiment, instead of the peak ratio I itself of the Raman spectrum directly reflecting the abundance ratio of $Fe_3O_4$ to $Fe_2O_3$ in the oxide film, the value of I/d obtained by dividing the peak ratio I by the thickness d of the oxide film is used as the film index. When the value of the film index I/d decreases due to a decrease in the peak ratio I or an increase in the thickness, the fluidity of the powder material is enhanced.

The larger the thickness of the oxide film on the surface of the Fe alloy particles is, the higher the effect of improving the fluidity is. On the other hand, from the viewpoint of reducing the amount of the oxide that may affect the quality of a three-dimensional shaped object to be manufactured when performing the additive manufacturing using the powder material, it is desirable to regulate the thickness of the oxide film on the surface of the Fe alloy particles as small as possible. Actually, in the present embodiment, as described above, the thickness of the oxide film is limited to 15 nm or less. Therefore, in the powder material according to the present embodiment, it is desirable that $Fe_3O_4$ is contained in the oxide film at a sufficient proportion to contribute to improvement of fluidity while regulating the thickness of the oxide film as small as possible, and sufficiently high fluidity is obtained while taking into consideration both contributions of the thickness of the oxide film and the chemical state of the oxide film using the film index I/d as an index.

Specifically, by setting the upper limit of the film index I/d to 0.025, the fluidity of the powder material can be ensured even when the oxide film is regulated to be thin. As shown in the following Example, when the film index I/d is 0.025 or less, the fluidity of the powder material is at a high level suitable for use as a raw material for additive manufacturing, in particular, additive manufacturing by a powder bed fusion method. The film index I/d is preferably 0.020 or less, and more preferably 0.015 or less, since the fluidity of the powder material can be more effectively enhanced. Although there is no particular lower limit to the film index I/d, the film index I/d is about 0.005 or more in consideration of Fe alloy particles that can be actually manufactured.

As described above, when the thickness d of the oxide film changes, the abundance ratio of $Fe_3O_4$ necessary for sufficiently enhancing the fluidity of the powder material also changes. Therefore, the value of the peak ratio I itself in the Raman spectrum is not particularly limited as long as the film index I/d is regulated to 0.025 or less. However, when a large amount of $Fe_3O_4$ is contained in the oxide film relative to $Fe_2O_3$ and a small peak ratio I is given, the film index I/d tends to take a small value, and the fluidity of the powder material is easily improved. For example, the peak ratio I is preferably 0.30 or less, and more preferably 0.25 or less. Although the lower limit of the peak ratio I is not particularly provided, the peak ratio I is about 0.05 or more in consideration of Fe alloy particles that can be actually manufactured.

In the present embodiment, the amount of oxygen contained in the oxide film is not particularly limited as long as the thickness d of the oxide film in the Fe alloy particles is regulated to 15 nm or less and the film index I/d is regulated to 0.025 or less. However, from the viewpoint of enhancing the effect of improving the fluidity by the formation of the oxide, an oxygen value (a proportion of oxygen atoms in the entire powder material) is preferably 0.035 mass % or more. On the other hand, from the viewpoint of inhibiting the formation of a large amount of oxide, the oxygen value is preferably 0.050 mass % or less.

As described above, the fluidity of the powder material can be enhanced by regulating the film index I/d to be small. The fluidity of the powder material can be evaluated by using, for example, the avalanche angle as an index. A powder material with a smaller avalanche angle exhibits higher fluidity. When the film index I/d is 0.025 or less as described above, the avalanche angle of the powder material can be regulated to less than 40°, which is a level capable of providing sufficiently high fluidity in additive manufacturing. The avalanche angle is preferably less than 35°. The lower limit of the avalanche angle is not particularly limited, but the avalanche angle is generally 25° or more in Fe alloy particles that can be actually manufactured.

In the powder material according to the present embodiment, the chemical state of the oxide film is defined by the abundance ratio of $Fe_3O_4$ to $Fe_2O_3$, and it is preferable that the Fe oxide contained in the film formed on the surface of the Fe alloy particles includes only $Fe_3O_4$ and $Fe_2O_3$, except for inevitable impurities. However, Fe oxides in another oxidized state are not prevented from being contained in the film. Furthermore, in addition to the Fe oxide, the film may contain a chemical species other than the Fe oxide, such as an oxide of a metal other than Fe or a carbide of Fe or another metal. Even in those cases, the film index I/d calculated from the peak intensity ratio I focusing on $Fe_3O_4$ and $Fe_2O_3$ should be 0.025 or less. It is preferable that chemical species other than $Fe_3O_4$ and $Fe_2O_3$ are not contained in the film in a larger amount than $Fe_3O_4$ so as not to significantly impair the fluidity-enhancing effect exhibited by $Fe_3O_4$.

[Method for Manufacturing Additive Manufacturing Powder Material]

Next, a method for manufacturing an additive manufacturing powder material according to an embodiment of the present invention will be described. By the method according to the present embodiment, the powder material according to the embodiment of the present invention described in detail above can be suitably manufactured.

When manufacturing the powder material, first, Fe alloy particles are prepared by a gas atomization method. As an atomization gas, an inert gas such as Ar may be used. In the Fe alloy particles prepared by the gas atomization method, oxidation of the surface does not proceed so much, and in general, the thickness of the oxide film is regulated to 10 nm or less, and the oxygen value is regulated to 0.035 mass % or less.

Next, the particles prepared by the gas atomization method are oxidized to form an oxide film on the surface. The oxide film is formed by heating the particles in vacuum (under reduced pressure). Heating in the atmosphere tends to generate a large amount of $Fe_2O_3$ having a high oxidation number, but heating in a vacuum can increase the generation ratio of $Fe_3O_4$.

The heating temperature at the time of forming the oxide film is preferably in the range of 100° C. to 150° C. from the viewpoint of efficiently generating $Fe_3O_4$. Furthermore, by adjusting the heating temperature within this range, the generation ratio of $Fe_3O_4$ to $Fe_2O_3$ can be changed. The higher the heating temperature is, the higher the proportion of $Fe_2O_3$ tends to be, that is, the peak intensity ratio I in the Raman spectrum tends to be large. The heating time may be appropriately selected, and may be, for example, in a range of 5 minutes to 120 minutes. When the heating time is lengthened, the thickness d of the oxide film tends to increase.

A degree of vacuum at the time of heating is not particularly limited, but it is sufficient when the pressure can be reduced to −0.05 MPa or less based on the atmospheric pressure. In addition, a configuration of a specific heating device is not particularly limited as long as the heating can be performed in vacuum. From the viewpoint of forming an oxide film having a thickness and a chemical state with high uniformity on the surface of each particle, it is preferable to use a device capable of heating a powder while vibrating the powder in vacuum, such as a vibration dryer.

EXAMPLE

Hereinafter, the present invention will be described in more detail with reference to Example. Here, a relationship between the state of the oxide film of Fe alloy particles and fluidity of the powder material was investigated. Hereinafter, unless otherwise specified, various evaluations were performed at room temperature in atmosphere.

[1] Comparison of State of Oxide Film and Fluidity

First, the state of the oxide film and fluidity were evaluated for a powder material prepared under typical conditions.

(Preparation of Samples)

Fe alloy particles were prepared by a gas atomization method using Ar gas. A composition of the Fe alloy contains 0.42% of C, 1.0% of Si, 0.4% of Mn, 5.0% of Cr, 1.2% of Mo, 1.0% of V, and 0.03% of O in terms of mass %, and a balance being Fe and inevitable impurities. An average particle diameter (d50) of the Fe alloy particles was 35 μm. A powder material formed of the Fe alloy particles thus obtained was used as Sample 0.

Sample 0 obtained by the gas atomization method as described above was oxidized under different conditions to produce Sample 1 and Sample 2. Sample 1 was obtained by heating Sample 0 in vacuum. Specifically, Sample 0 was heated while being vibrated in vacuum (−0.1 MPa based on the atmospheric pressure) by using a vibration dryer capable of reducing pressure ("VU-45 type", manufactured by Chuo Kakohki Co., Ltd.). As for the heating temperature and the heating time, the sample was held at 125° C. for 1 hour.

Sample 2 was obtained by heating Sample 0 in the atmosphere. Specifically, Sample 0 was heated in a constant temperature dryer in a state in which Sample 0 was allowed to stand in the atmosphere. The heating temperature and the heating time were kept at 125° C. for 1 hour.

(Evaluation of State of Sample)

(1) Thickness

For each sample, thickness of the oxide film was estimated by micro-Auger electron spectroscopy. The measurement was performed by evaluating a depth distribution of concentrations of O and Fe by a depth analysis method using Ar sputtering. At this time, after it was confirmed that the surface layer mainly contained Fe and O, a thickness at which the O concentration was half that of the outermost surface was estimated and used as the thickness of the oxide film. The film thicknesses were obtained for five randomly selected particles and averaged, and the average value was used as a thickness value for each sample.

(2) Chemical State

For each sample, a chemical state of the oxide film on the particle surface was evaluated by Raman spectroscopy. Raman spectrometry was performed on each particle by using a microscopic Raman spectrophotometer. As excitation light, laser light having a wavelength of 532 nm (intensity: 0.7 mW) was used. The measurement was performed on 15 randomly selected particles. In Raman spectra obtained for the respective particles, a background (baseline) was removed and then, the Raman spectra of 15 particles were averaged. Then, in the average Raman spectrum, an integrated intensity IA of a peak A was obtained by integrating a spectral intensity in a region of a Raman shift of 657.5 to 677.5 $cm^{-1}$, and an integrated intensity IB of a peak B was obtained by integrating a spectral intensity in a region of a Raman shift of 1,309 to 1,329 $cm^{-1}$. When determining the integrated intensity, peak separation was not performed, and intensity values of the Raman spectra that were averaged after removing the background were integrated. Then, the peak ratio I was calculated as I=IB/IA. Further, the value of the peak ratio I was divided by the thickness d evaluated above by micro Auger electron spectroscopy to obtain a film index I/d.

(3) Oxygen Value

An oxygen value of each sample was measured. The measurement was performed by an inert gas fusion infrared absorption method using TC600 Nitrogen and Oxygen Analyzer, manufactured by LECO corporation, in accordance with JISG1239: 2014.

(4) Avalanche Angle

An avalanche angle of each sample was evaluated by using a rotary drum-type powder fluidity measuring device. A powder material was accommodated in a transparent rotary drum, and a state of the powder material was photographed from the outside of the rotary drum while rotating the rotary drum at a rotational speed of 0.6 rpm. Then, an angle of the powder material when an avalanche phenomenon occurred (an angle formed by an inclined surface of the powder material and a horizontal surface) was recorded as the avalanche angle.

(Evaluation Results)

First, the Raman spectra obtained for Samples 0 to 2 are shown in FIG. 1. For the respective sample, a spectrum obtained by removing the background from spectra measured for 15 particles and averaging the spectra is shown. As is most remarkably shown in the spectrum of Sample 2, in each spectrum, two clear peaks of the peak A having a peak top in a region of a Raman shift of 657.5 to 677.5 $cm^{-1}$ and the peak B having a peak top in a region of a Raman shift of 1,309 to 1,329 $cm^{-1}$ appear. In comparison with a standard spectrum, the peak A on a low wave number side can be attributed to $Fe_3O_4$, and the peak B on a high wave number side can be attributed to $Fe_2O_3$. A broad peak C seen on the lower wave number side of the peak A is attributed to $Fe_2O_3$.

When comparing the Raman spectra of Samples 0 to 2, both the peak A and the peak B are relatively low in intensity in Sample 0 that was before the oxidation treatment. In Sample 1 oxidized in vacuum, the peak B was not substantially grown, whereas the peak A was remarkably grown, as compared with Sample 0. In other words, while the amount of $Fe_2O_3$ was not substantially increased, the generation of $Fe_3O_4$ progressed in Sample 1. On the other hand, in Sample 2 oxidized in the atmosphere, both the peak A and the peak B were remarkably grown as compared with Sample 0. That is, both $Fe_2O_3$ and $Fe_3O_4$ were generated in Sample 2. When comparing Sample 1 and Sample 2, the intensity of the peak A was substantially the same between Sample 1 and Sample 2, whereas the intensity of the peak B was significantly higher in Sample 2. In other words, compared to Sample 1, Sample 2 had a larger abundance ratio of $Fe_2O_3$ to $Fe_3O_4$. This becomes clearer when the peak intensity ratio I is obtained.

Figure 2A:
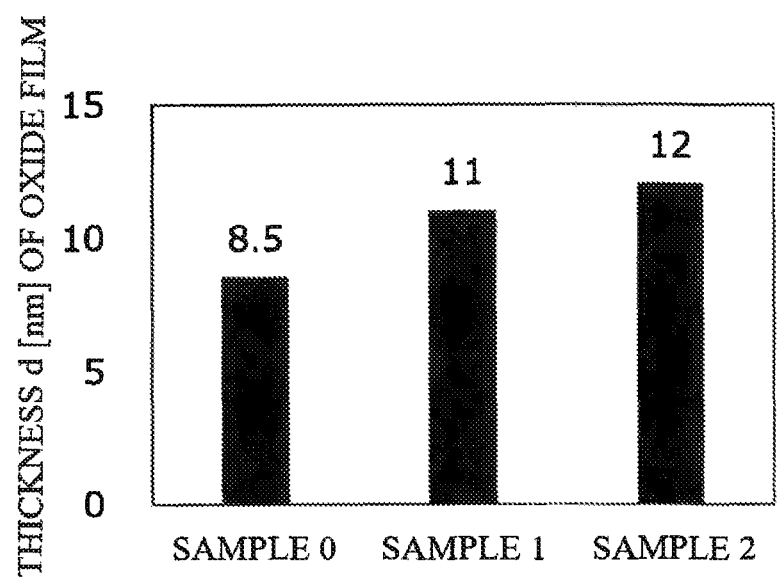
FIGS. 2A to 2E are diagrams comparing various characteristics of the three samples shown in FIG. 1: as characteristics, a thickness d of the oxide film in FIG. 2A, an oxygen value in FIG. 2B, a peak intensity ratio I (=IB/IA) in FIG. 2C, a film index (I/d) in FIG. 2D, and an avalanche angle in FIG. 2E are shown.
Figure 2B:
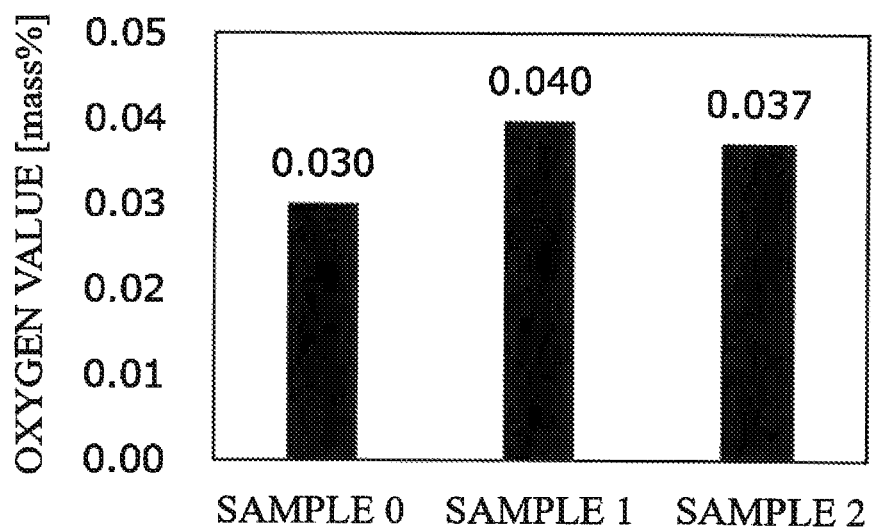
Figure 2C:
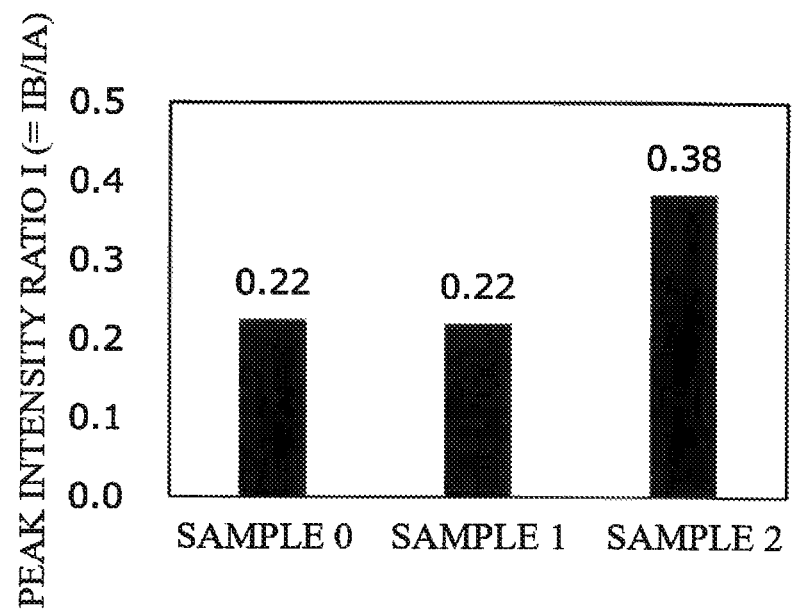
Figure 2D:
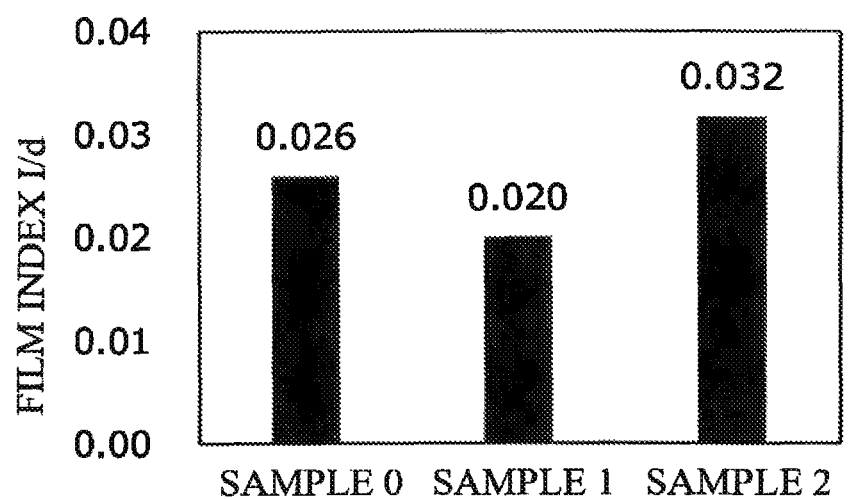
Figure 2E:
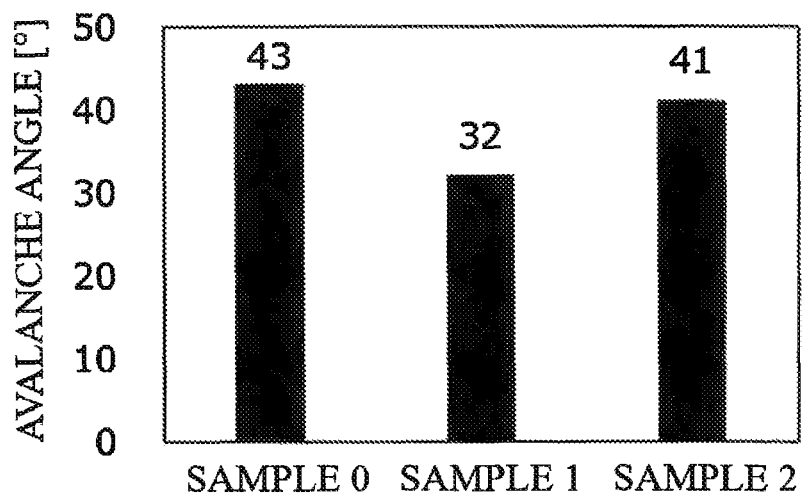

FIGS. 2A to 2E summarize the evaluation results obtained by the respective evaluation methods for Samples 0 to 2. FIG. 2A shows the thickness d of the oxide film, FIG. 2B shows the oxygen value, FIG. 2C shows the peak intensity ratio I (=IB/IA), FIG. 2D shows the film index (I/d), and FIG. 2E shows the avalanche angle. First, when comparing the thicknesses of the oxide films in FIG. 2A, the thicknesses in both Samples 1 and 2 were increased through the oxidation from Sample 0. The thickness in Sample 1 was almost the same as that in Sample 2. The oxygen values in both Samples 1 and 2 were increased through the oxidation from Sample 0. The oxygen value in Sample 1 was not greatly different from that in Sample 2. That is, it can be said that the amount of oxygen atoms constituting the Fe oxide was not different so much between Sample 1 and Sample 2.

However, when observing the peak intensity ratio I based on a Raman spectrum shown in FIG. 2C, the peak intensity ratio of Sample 2 was significantly increased to about 1.7 times as large as that of Sample 0 that was before oxidation, whereas the peak intensity ratio of Sample 1 was not changed. This is the same as the tendency observed in the Raman spectrum of FIG. 1. As described above, since the thickness of the oxide film was almost the same between Sample 1 and Sample 2, this relationship that the value of the peak intensity ratio I of Sample 2 was larger than that of Sample 1 was similarly observed in the film index I/d shown in FIG. 2D. From these results, it was confirmed that a ratio of abundance of $Fe_2O_3$ to $Fe_3O_4$ was significantly larger in Sample 2 than in Sample 1. In other words, in Sample 1 that was oxidized in vacuum, the generation of $Fe_2O_3$ was inhibited and the generation of $Fe_3O_4$ was promoted in terms of the relative amounts of $Fe_2O_3$ and $Fe_3O_4$ compared to Sample 2 that was oxidized in the atmosphere. The value of the film index I/d was 0.025 or less in Sample 1, and exceeded 0.025 in Sample 0 and Sample 2.

Next, when comparing the measured values of the avalanche angle shown in FIG. 2E for each sample, the avalanche angle was smaller in both Samples 1 and 2 than in Sample 0, but the decrease of the avalanche angle was more significant in Sample 1. The smaller the avalanche angle is, the higher the fluidity of the powder material is. That is, although both Samples 1 and 2 had improved fluidity as compared with Sample 0 that was before oxidation, Sample 1 that was oxidized in vacuum had remarkably improved fluidity as compared with Sample 2.

Summarizing the above results, the peak intensity ratio I and the film index I/d were smaller in Sample 1 in which oxidation was performed in vacuum than in Sample 2 in which oxidation was performed in the atmosphere. That is, the proportion of $Fe_3O_4$ to $Fe_2O_3$ was larger in the oxide film in Sample 1 than in Sample 2. In addition, higher fluidity was obtained in Sample 1 than in Sample 2. Based on these findings, it is confirmed that $Fe_3O_4$ has a higher effect on the improvement of the fluidity of the powder material than $Fe_2O_3$.

[2] Relationship Between State of Oxide Film and Fluidity

Next, the number of samples was further increased, and the relationship between the state of the oxide film and the fluidity was examined in detail.

(Preparation of Samples)

Samples 1a to 1e were produced by heating the powder material of Sample 0 produced in the above test [1] in vacuum in the same manner as in Sample 1 except for changing the heating temperature and/or the heating time. In addition, Samples 2a to 2f were produced by heating the powder material of Sample 0 in the atmosphere in the same manner as in Sample 2 except for changing the heating temperature and/or the heating time. In each of Samples 1a to 1e and Samples 2a to 2f, the thickness and the chemical state of the oxide film were changed by changing the heating temperature and/or the heating time. The heating temperature mainly affects the chemical state (oxidation number) of the oxide film, and increasing the heating temperature makes it easier to generate $Fe_2O_3$ than $Fe_3O_4$. The heating time mainly affects the thickness of the oxide film, and as the heating time is increased, a thick oxide film is more likely to be formed.

(Evaluation of State of Sample)

For each of the prepared samples, the film thickness d of the oxide film, the chemical state (peak intensity ratio I based on the Raman spectrum), and the avalanche angle were evaluated in the same manner as in the above test [1].

(Evaluation Results)

Table 1 below summarizes the values of the thickness d of the oxide film, the peak intensity ratio I, the film index I/d, and the avalanche angle for Samples 0 to 2 produced in the above test [1], newly produced Samples 1a to 1e, and Samples 2a to 2f.

TABLE 1

| Oxidizing conditions | Sample number | Thickness d [nm] of oxide film | Peak intensity ratio I (=IB/IA) | Film index I/d | Avalanche angle [°] |
|---|---|---|---|---|---|
| Before oxidation | 0 | 8.5 | 0.22 | 0.026 | 43 |
| Vacuum | 1 | 11 | 0.22 | 0.020 | 32 |
|  | 1a | 13 | 0.07 | 0.005 | 30 |
|  | 1b | 12 | 0.12 | 0.010 | 31 |
|  | 1c | 12 | 0.18 | 0.015 | 32 |
|  | 1d | 13 | 0.26 | 0.020 | 33 |
|  | 1e | 10 | 0.25 | 0.025 | 35 |
| Atmosphere | 2 | 12 | 0.38 | 0.032 | 41 |
|  | 2a | 8 | 0.24 | 0.030 | 40 |
|  | 2b | 7 | 0.25 | 0.035 | 45 |
|  | 2c | 6 | 0.24 | 0.040 | 50 |
|  | 2d | 12.5 | 0.40 | 0.032 | 41 |
|  | 2e | 11.9 | 0.44 | 0.037 | 46 |
|  | 2f | 10 | 0.42 | 0.042 | 48 |

According to Table 1, it can be seen that a sample group 1 (Sample 1 and Samples 1a to 1e) that was oxidized in vacuum has a smaller avalanche angle and higher fluidity than a sample group 2 (Sample 2 and Samples 2a to 2f). In addition, in general, the peak intensity ratio I of the sample group 1 tends to be smaller than that of the sample group 2. That is, in general, it can be seen that the avalanche angle tends to be small in a sample having a small peak intensity ratio I. However, although Samples 1d, 1e, and 2a to 2c show very close peak intensity ratios I within 0.24 to 0.26, the avalanche angles thereof are largely dispersed in a range of 33° to 50°. That is, a correlation between the peak intensity ratio I and the avalanche angle is not always high.

Figure 3:
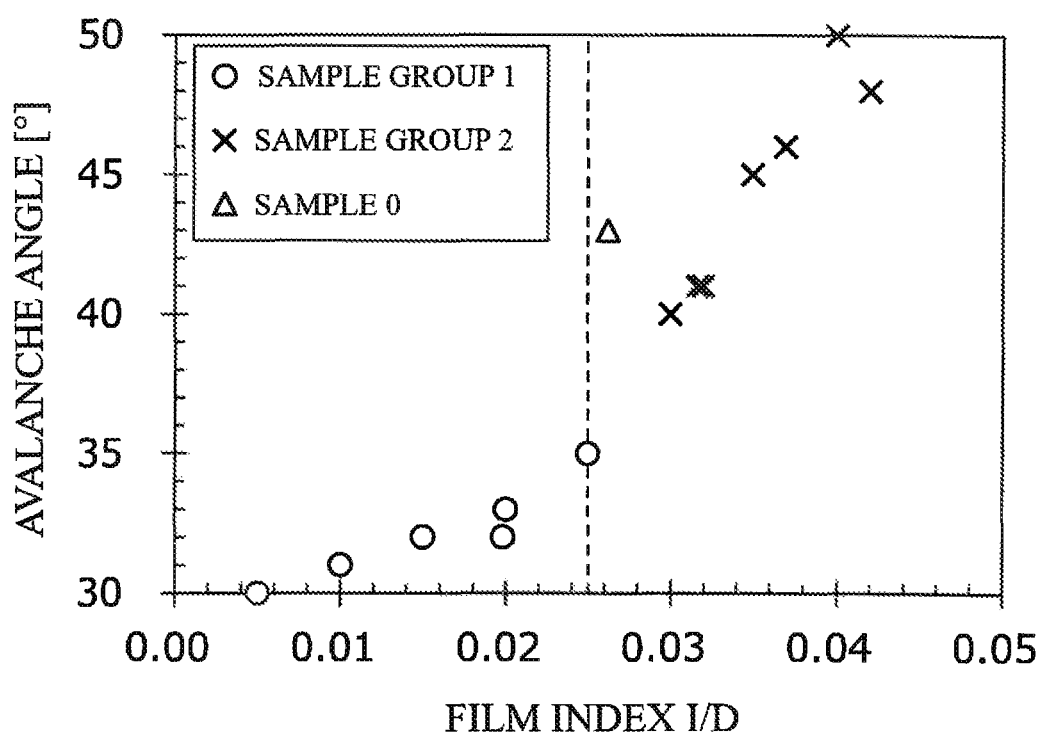
FIG. 3 is a diagram showing a relationship between the film index I/d and the avalanche angle for various powder materials.

On the other hand, when attention is paid to the film index I/d obtained by dividing the peak intensity ratio I by the thickness d [nm] of the oxide film, it can be clearly seen that the value of the film index I/d is smaller in the sample group 1 than in the sample group 2, and high correlation with the avalanche angle is exhibited. This tendency becomes clearer when displayed in a graph. FIG. 3 plots the relationship between the film index I/d and the avalanche angle for all the samples shown in Table 1. Data of the sample group 1 is indicated by a circle mark (○), and data of the sample group 2 is indicated by a cross mark (×). In addition, the data of Sample 0 which was not oxidized is indicated by a triangle mark (Δ).

According to FIG. 3, a monotonically increasing trend in which the avalanche angle increases as the film index I/d increases appears clearly. In addition, data points of the sample group 1 and data points of the sample group 2 smoothly continue to each other and show a monotonically increasing tendency. From these results, it can be seen that there is a high correlation between the film index I/d and the avalanche angle. When the film index I/d is small, it can be determined that the avalanche angle is small and the fluidity of the powder material is high.

When a powder material has an avalanche angle of less than 40°, it can be considered that the powder material has sufficiently high fluidity for use in additive manufacturing. As indicated by a broken line in FIG. 3, an avalanche angle of less than 40° is obtained in a region where the film index I/d is 0.025 or less. The film index I/d of 0.025 or less is achieved in the sample group 1, which employs oxidation in vacuum. It can be said that performing oxidation in vacuum effectively generates $Fe_3O_4$ in terms to a ratio to $Fe_2O_3$ even when the film thickness d of the oxide film is small.

The embodiments and Examples of the present invention have been described above. The present invention is not particularly limited to the embodiments and Examples, and various modifications can be made.

What is claimed is:

1. An additive manufacturing powder material, comprising:
   Fe alloy particles each having an oxide film on a surface thereof, wherein
   the Fe alloy particles satisfy d≤15 and I/d≤0.025,
   where d [nm] represents a thickness of the oxide film,
   prior to shaping into an object, the powder material gives a Raman spectrum having a peak A with a peak top in a region A of a Raman shift of 657.5 to 677.5 $cm^{-1}$ and a peak B with a peak top in a region B of a Raman shift of 1,309 to 1,329 $cm^{-1}$,
   IA represents an integrated intensity of the peak A in the region A in the Raman spectrum,
   IB represents an integrated intensity of the peak B in the region B in the Raman spectrum, and
   a peak intensity ratio I represents an intensity ratio IB/IA of the peak B to the peak A.

2. The additive manufacturing powder material according to claim 1, satisfying 8≤d≤15.

3. The additive manufacturing powder material according to claim 1, further satisfying I≤0.30.

4. The additive manufacturing powder material according to claim 2, further satisfying I≤0.30.

5. The additive manufacturing powder material according to claim 1, having an avalanche angle of less than 40°.

6. The additive manufacturing powder material according to claim 1, wherein the powder material has an oxygen value of 0.035 mass % or more where the oxygen value is defined as a proportion of oxygen atoms in the entire powder material.

7. The additive manufacturing powder material according to claim 1, wherein the Fe alloy particles have an average particle diameter d50 of 10 μm or more and 500 μm or less.

8. The additive manufacturing powder material according to claim 1, further comprising nanoparticles in an amount of 0.1 mass % or less based on the Fe alloy particles.

9. A method for manufacturing an additive manufacturing powder material, comprising:
   preparing Fe alloy particles by a gas atomization process; and
   heating the Fe alloy particles in vacuum to form an oxide film on a surface of each of the Fe alloy particles.

10. The method for manufacturing an additive manufacturing powder material, according to claim 9, wherein in heating the Fe alloy particles in vacuum, the pressure is reduced to −0.05 MPa or less based on the atmospheric pressure.

11. The method for manufacturing an additive manufacturing powder material, according to claim 9, wherein in heating the Fe alloy particles in vacuum, the Fe alloy particles are heated at a temperature range of 100° C. to 150° C. for 5 minutes to 120 minutes.

\* \* \* \* \*